United States Patent [19]

Kropac

[11] 4,403,232
[45] Sep. 6, 1983

[54] ELECTROSENSITIVE RECORDING PAPER HAVING IMPROVED RECORDING DENSITY

[75] Inventor: Joseph M. Kropac, Maitland, Fla.

[73] Assignee: Exxon Research and Engineering Co., Florham, N.J.

[21] Appl. No.: 345,426

[22] Filed: Feb. 3, 1982

[51] Int. Cl.³ .................. G01D 15/34; G01D 15/08
[52] U.S. Cl. .............................. 346/135.1; 346/165; 428/480
[58] Field of Search ................. 346/135.1, 162, 163, 346/164, 165; 428/480, 420; 204/2

[56] References Cited

U.S. PATENT DOCUMENTS

| | | | |
|---|---|---|---|
| 2,664,044 | 12/1953 | Dalton | 346/135.1 X |
| 3,511,700 | 5/1970 | Miro | 346/1.1 X |
| 3,786,518 | 1/1974 | Atherton | 346/135.1 |
| 3,891,513 | 6/1975 | Yasumori | 346/135.1 X |
| 3,920,873 | 11/1975 | Diamond | 346/163 X |
| 4,012,292 | 3/1977 | Fujiwara | 346/135.1 X |
| 4,082,902 | 4/1978 | Suzuki | 346/135.1 X |
| 4,208,467 | 6/1980 | Coney | 428/480 |
| 4,308,314 | 12/1981 | Nakano | 346/135.1 X |

Primary Examiner—Joseph W. Hartary
Attorney, Agent, or Firm—Stanley D. Schwartz

[57] ABSTRACT

An electrosensitive recording member having a base support, conductive polyester layer on the base support, and a contrasting surface recording layer is disclosed. Improved recording density is achieved by incorporating a divalent metal salt of organic acid containing up to 13 carbon atoms into the conductive polyester layer.

18 Claims, 2 Drawing Figures

ELECTROSENSITIVE RECORDING PAPER HAVING IMPROVED RECORDING DENSITY

BACKGROUND OF THE INVENTION

1. Field of the Invention

This invention is in the field of electrical recording media for various data, message and graphic imaging devices. More particularly, this application relates to improvements in the preparation of electrosensitive recording media or sheets and the recording density of products produced thereby and commonly referred to as "spark-recording", "burn-off" or "electrosensitive recording" papers, films and foils, having a plurality of layers that are arranged in such a manner that recording is achieved by the local destruction of the required recording layer or layers by means of an electrical signal passing through a stylus spark discharge or other electronic recording member in contact with the surface of the recording media or sheet.

2. Description of the Prior Art

The recording of electrical signals as an image has significantly increased in recent years due to the wide acceptance of facsimile and other telecommunication devices. Recording is generally accomplished on a recording medium or sheet that is regarded as being "surface conductive" or "front grounding" because the current being passed therethrough enters and exits through one of the upper layers of the recording media due to the presence of a plain paper, film or other insulating substrate. Where a conductive paper, foil or other low resistance substrate is used, the recording media or sheet is regarded as being "through conductive" or "back grounding" because the current path travels entirely through the recording media.

The preparation of "front grounding" and "back grounding" recording media or sheets are well-known in the art as exemplified by Miro in U.S. Pat. No. 3,511,700 and Diamond in U.S. Pat. No. 3,920,873.

In using electrosensitive recording sheets, it is most desireable to utilize a sheet that exhibits satisfactory recording densities, that is, a sheet wherein the printed image is of a desired darkness.

It is therefore a significant object of the present invention to improve the image or recording density of images recorded on "surface-conductive" and "through-conductive" recording members or sheets. By image or recording density, it is intended that the darkness or blackness of the recorded indicia be improved.

SUMMARY OF THE INVENTION

The present invention relates to an electrosensitive recording member comprising: (1) a base support; (2) a conductive polyester layer on said support, comprising a polyester resin matrix, a conductive pigment dispersed in said matrix, and a divalent metal salt of an organic acid containing up to 13 carbon atoms; and (3) a contrasting surface recording layer with respect to said polyester layer, said recording surface layer being combustible at the temperature developed during passage of marking current through said medium to selectively reveal the underlying contrasting polyester layer, said metal salt being present in an amount effective to improve the image quality of the product.

DETAILED DESCRIPTION OF THE PRESENT INVENTION

Figure 1:
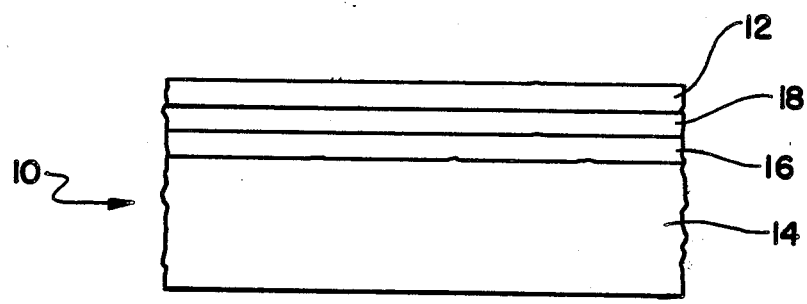
FIG. 1 is an enlarged cross-sectional and idealized view of a "surface-conductive" electrosensitive recording paper in accordance with this invention.
Figure 2:
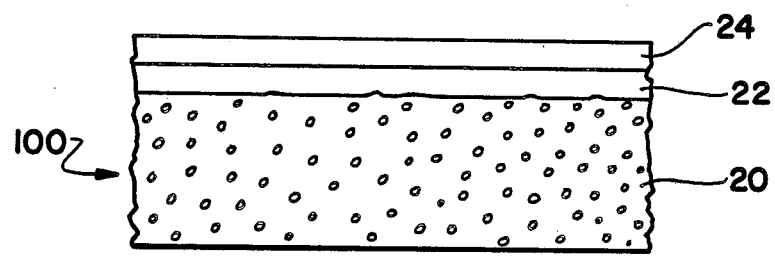
FIG. 2 is an enlarged cross-sectional and idealized view of a "through-conductive" electrosensitive recording paper in accordance with this invention.

Referring to FIGS. 1 and 2, of the drawings, recording sheets generally identified as 10 and 100, respectively, are illustrated. FIG. 1 illustrates a "surface-conductive" (or front conductive) recording medium or sheet that is generally carried on a rotating drum (not illustrated) during the recording process. During the recording process, a stylus needle or other electronic recording means (not illustrated) is in light contact with the recording sheet and in particular, the surface recording layer 12. Recording layer 12 is removed or otherwise caused to disintegrate by the action of an electric discharge applied thereto by the electronic recording means in a manner well-known in the art.

Recording medium 10 comprises a base support 14 of relatively high resistivity, a conductive "ground-coat" 16 on base support 14, a conducting polyester layer 18 that is preferably "dark" on layer 16, with a preferably light-colored, surface recording layer 12 on layer 18.

No current flows into base support member 14 because it is non-conductive and generally exhibits a surface resistivity greater than $1 \times 10^7$ ohms per square cm. when measured at standard conditions of 73° F. and 50% RH (relative humidity). Useful base members include, in sheet form, paper such as "bond" paper or other high quality papers, plastic film, e.g., acetate film, vinyl chloride film, polyethylene film or polyester film, or a laminated sheet of a paper and a plastic film, as well as synthetic papers generally formed by combining a synthetic resin and cellulosic fibers. The thickness of base support member 12 is generally between 1.0 and 2.0 mils for plastic films; generally between 2.5 and 3.0 mils for paper; and up to 8 mils for cardboard or tag stock. It is understood that thicknesses greater or lesser than the aforementioned values may be employed provided that the base member provides satisfactory support for the recording medium as a whole and that the base member is sufficiently insulating and does not permit the electric charge applied to the recording medium surface or recording layer 12 to pass through base member 14.

Layer 16 is electrically conductive base layer exhibiting a maximum resistivity of about $10^4$ ohms. Generally, this layer consists of conductive particles, e.g., carbon blacks, dispersed in a suitable binder, the carbon blacks accounting for the conductivity as well as the dark color of this layer. In addition to carbon blacks, other conductive particles that may be dispersed in a resin matrix include well-known conductive metals having a specific resistance of not more than $2 \times 10^4$ ohm-cm, preferably not more than $2 \times 10^{-5}$ ohm-cm.

The metal powders include not only powders of metallic elements, but also powders of alloys of two or more metals and of products obtained by coating highly conductive metals with metal powders have low conductivity. Examples of suitable metal powders are metal elements such as copper, aluminum, zinc, and iron, alloys of at least two metal elements such as stainless steel, brass and bronze and a copper powder coated with silver. Some conductive metal-containing compounds can also be dispersed in the resin matrix and they may include, e.g., cuprous iodide. The carbon blacks are most preferred for a resin matrix.

The resistivity of this layer and other layers of the recording medium discussed herein represents the surface resistance and is measured in accordance with Dalton, U.S. Pat. No. 2,664,044.

The metal powder can be dispersed in a resin in an amount which makes it possible for the resulting metal-containing resin to have the above-specified surface resistance. The amount of the conductive powder can therefore be varied widely according to the type, particle diameter, shape, etc. of the metal in this layer and layer 18. Generally, the amount of conductive particles is at least parts by weight, preferably 50 to 60 parts by weight, more preferably 200 to 400 parts by weight, per 100 parts by weight of the resin.

The resin which constitutes the resin matrix in which the conductive particles are dispersed may be any thermoplastic or thermosetting resin which has film-forming ability and electrical insulation. Generally, the matrix resin preferably has a great ability to bind the conductive particles and can be formed into sheets or films having high mechanical strength, flexibility and high stiffness.

Examples of suitable resins that can be used in this invention are thermoplastic resins such as polyolefins (such as polyethylene or polypropylene), polyvinyl chloride, polyvinyl acetal, cellulose acetate, polyvinyl acetate, polystyrene, polymethyl acrylate, polymethyl methacrylate, polyacrylonitrile, thermoplastic polyesters, polyvinyl alcohol, gelatin, methyl cellulose, hydroxyethyl cellulose, carboxymethyl cellulose; and thermosetting resins such as thermosetting polyesters, epoxy resins, and melamine resins. The thermoplastic resins are preferred, and polyethylene, polyvinyl acetal, cellulose acetate, thermoplastic polyesters, and polyvinyl chloride are especially preferred.

As is conventional in the art, additives such as plasticizers, fillers, lubricants, stabilizers, antioxidants or mold releasing agents may be added as needed to the resin in order to improve the moldability, storage stability, plasticity, tackiness, lubricity, etc., as well as coloring substances or pigments for the purpose of imparting a desired color thereto.

Layer 16, having the aforementioned composition may be laminated on layer 14 of an electric discharge recording material as a bonded layer, or a separate independent layer to be superimposed in a film or sheet form on layer 14 of the recording material. The thickness of this layer is not critical, and can be varied over a wide range. Generally, the thickness is at least preferably 0.3 to 1.0 mil.

The thickness of the conductive resin layer 16 is not critical, and can be varied over wide ranges in accordance with the desired use of the final product. Generally, conductive resin layer 16 is at least 0.1 mil and preferably between 0.2 and 0.6 mil thick with the resistance generally between 50 and 1500 ohms per square centimeter.

Conductive layer 16 may also be a vacuum-deposited metal layer. Specific examples of a metal that can be deposited include aluminum, zinc, copper, silver and gold. Of these metals, aluminum is the most suitable. The thickness of the vacuum-deposited metal layer is not critical but generally is at least 300 Å and generally between 600 and 1000 Å thick. In accordance with conventional vacuum deposition techniques, the metal can be deposited onto layer 14.

According to another embodiment of this invention, layer 16 may also be a thin metal foil, for example, an aluminum foil. It can be applied to one surface of base layer 14 by such conventional means as bonding or plating. Such metal layers generally have a surface resistance of from about 0.5–50 ohms per square centimeter.

The top coat or masking coat 12 is typical of the conventional masking coats used in the production of electrosensitive recording mediums and is applied in accordance with conventional coating processes. The top coat 12 generally consists of a mixture of a whitish pigment, e.g., zinc oxide, zinc sulfide, etc., in a resin binder, e.g., cellulose acetate butyrate, polyvinyl butyral, polyvinyl acetate copolymers, cellulose nitrate, polyethylene, ethyl cellulose as well as aqueous dispersion resins of the various types, including those already mentioned herein. Other suitable coloring agents that can be employed in the masking coat 12 include, e.g., blanc fixe, barytes, and lithopone.

In prior known electrosensitive recording mediums, as well as the subject recording medium of the present invention, the contrast between the marked and unmarked areas is achieved substantially entirely by the presence of the whitish pigment in the masking coat 12 and the rather dark or contrasting color in layer 16 which becomes exposed when the recording medium is subjected to the action of an electric discharge marking device in the form of a minute arc, spark or corona discharge.

Between the top coat or masking coat 12 and conductive 1 layer 16 is conductive polyester layer 18 which is the subject of commonly assigned copending applications Ser. No. 341,676 filed Jan. 22, 1982 and Ser. No. 341,675 filed Jan. 22, 1982. Layer 18 is stable and does not depolymerize when subjected to the build-up of heat associated with the marking of the surface of the electrosensitive recording medium. Suitable polyester useful in the practice of this invention, that do not depolymerize at such marking temperatures which are generally in the range of about 1200° F., include polyesters derived from di- and tri-carboxylic acids and dialcohols. Preferred di- and tri-carboxylic acids contain from 3 to 10 carbon atoms and include, e.g., phthalic acid, isophthalic acid, terephthalic acid, trimellitic acid, malonic acid, succinic acid, glutaric acid, adipic acid, maleic acid, fumaric acid and sebacic. It is understood that the corresponding anhydrides of these acids may also be used in the formation of the desired polyesters.

Preferred dialcohols are glycols generally containing between 2 and 15 carbon atoms and include, for example, ethylene glycol, propylene glycol butane diol 1,5-pentanediol, 2,3-dimethyl-2,3-butanediol, 2,3-dimethyl-2,3-butanediol, 2,2-dimethyl-1,3-propanediol, hexane diol, 4-methyl-2,4-pentanediol, 2,2,4-trimethyl-1,3-pentanediol and bisphenol A [2,2-bis(4-hydroxyphenol)propane]. Preferred polyesters useful in the practice of this invention are polyesters derived from propylene glycol and isophthalic acid and having a molecular weight in the range of 1,500 and 12,000, and preferably between 5,000 and 9,000. Best results are achieved with the polyester having a molecular weight between about 6,000 and 8,000.

Layer 18, like layer 16, is conductive, as noted hereinbefore, the conductivity generally being due to the dispersion of conductive materials throughout this layer. The conductive particles employed in this layer are the same as employed in layer 16, with carbon black being particularly preferred. Carbon particles are generally employed in an amount between 8 and 40%, and preferably between 12 and 25% by weight of the polyester layer. It is understood that these ranges will vary slightly with the type of carbon particles employed due to the slight differences in conductivity of various types of carbon particles. Generally, the surface resistivity of layer 18 is generally between 500 to 15,000, and preferably between 1,000 and 5,000 ohms per square centimeter.

With reference to the electrosensitive recording medium illustrated in FIG. 2, this recording medium differs from the recording medium of FIG. 1 in that the base support 20 is a conventional conductive base support generally comprising paper, synthetic paper or synthetic resin which may contain conductive carbon. This layer is generally between 2.5 and 4.0 mils thick and exhibits a surface resistivity of between about 50 to 1,500 ohms/cm$^2$. It is noted that the use of a conductive base support 20 in an electrosensitive recording medium is desired wherein rear grounding of the recording medium is desired and should be compared to the front grounding recording medium of FIG. 1 wherein the base support layer 14 does not contain any conductive materials dispersed therein, but does contain an additional conductive layer 16.

Layer 22 is a conductive polyester layer that corresponds to and is essentially the same as layer 18, of recording medium 10, both with respect to properties and formulation. In addition, recording medium 100 further comprises a top coat or masking coat 24 that is essentially the same as top coat or masking coat 12, of recording medium 10.

The recording medium of the present invention contain a plurality of layers, each of which differs in electrical conductivity such that the conductivity of each of the layers varies transversely and progressively through each adjacent layer over the thickness of the recording medium, as taught in Dalton, U.S. Pat. No. 2,664,044, and others.

The recording density, i.e., the darkness of the printed image, of the recording mediums or sheets of this invention are significantly enhanced by incorporating an effective amount of a multi-valent metal soap of an organic carboxylic acid having from 6 to 22 carbon atoms into any one or more of the conductive layers of the recording medium that is subjected to the action of a stylus, spark discharge or other electronic recording member causing at least a portion of said layer or layers to be destroyed such that contrasting printed matter is caused to appear thereon. Generally, such multi-valent metal salts are incorporated into one or more of the conductive layers existing beneath the top coating or masking coat 12 or 24 of the recording medium, and preferably only in the conductive polyester layer 18 or 22 of the recording medium.

The multivalent metals which may be used in the preparation of such soaps include divalent metals, e.g., iron, zinc, nickel, manganese, cobalt, lead, copper and calcium, and rare earth metals, e.g., cerium, lanthanum and mixtures thereof. Divalent metals are preferred. Suitable organic carboxylic acids include: (1) saturated acids, e.g., lauric acid, and 2-ethyl-hexoic acid; (2) unsaturated acids, e.g., linoleic acid, linolenic acid, oleic acid; (3) cycloaliphatic acids, e.g., naphthenic acid, as well as (4) complex acids, e.g., tall oil acids, rosin oil acids and rosin acids. Particularly preferred soaps used in the practice of this invention include calcium naphthenate iron naphthenate, mixed cerium and lanthanum octoate, with best results being achieved with calcium naphthenate.

The amount of multivalent metal soap incorporated into the layers generally ranges between 0.5 and 15% by weight and preferably between 1 and 88% by weight metal based on the total weight of carbon, preferably carbon black, dispersed in the particular layer.

What is claimed is:

1. An electrosensitive recording member comprising:
   (a) a base support;
   (b) a conductive polyester layer on said support, comprising a polyester resin matrix, a conductive pigment dispersed in said matrix and an effective amount of a multivalent metal salt of an organic acid containing up to 13 carbon atoms to improve the image density of recording member; and
   (c) a contrasting surface recording layer with respect to said polyester layer, said recording surface layer being vaporizable at the temperature developed during passage of marking current through said medium to selectively reveal the underlying contrasting polyester layer.

2. The electrosensitive recording member of claim 1 wherein said base support is conductive.

3. The electrosensitive recording member of claim 2 wherein said conductive pigment is carbon.

4. The electrosensitive recording member of claim 3 wherein said conductive polyester layer contains between 0.5 and 15% by weight of said multivalent metal salt based upon the weight of carbon in said layer.

5. The electrosensitive recording member of claim 4 wherein said multivalent metal salt is a divalent metal salt of a saturated acid.

6. The electrosensitive recording member of claim 4 wherein said multivalent metal salt is a divalent metal salt of naphthenic acid.

7. The electrosensitive recording member of claim 6 wherein said multivalent metal salt is calcium naphthenate.

8. The electrosensitive recording member of claim 1 further comprising a base conductive layer between said base support member and said conductive polyester layer, said base conductive layer having a resistivity greater than the resistivity of said conductive polyester layer.

9. The electrosensitive recording member of claim 8 wherein said base member is electrically non-conductive.

10. The electrosensitive recording member of claim 9 wherein said base member is paper.

11. The electrosensitive recording member of claim 10 wherein said conductive pigment is carbon.

12. The electrosensitive recording member of claim 11 wherein said conductive polyester layer contains between 0.5 and 15% by weight of said multivalent metal salt based upon the weight of carbon in said layer.

13. The electrosensitive recording member of claim 11 wherein said multivalent metal salt is a divalent small salt of a saturated acid.

14. The electrosensitive recording member of claim 13 wherein said multivalent metal salt is a divalent metal salt of naphthenic acid.

15. The electrosensitive recording member of claim 14 wherein said multivalent metal salt is calcium naphthenate.

16. The electrosensitive recording member of claim 15 wherein said conductive pigment is carbon black.

17. The electrosensitive recording member of claim 15 wherein said conductive pigment is present in said polyester matrix in an amount sufficient to provide the layer with a resistivity between said base conductive layer and said surface recording layer.

18. The electrosensitive recording member of claim 8 wherein said base conductive layer is a metal foil.

* * * * *